United States Patent [19]
Simons et al.

[11] 3,852,474
[45] Dec. 3, 1974

[54] ANESTHETIC TRIFLUOROMETHYLCYCLOBUTANES

[75] Inventors: Charles W. Simons, Bedford; Robert S. Holdsworth, Arlington, both of Mass.

[73] Assignee: W. R. Grace & Co., Cambridge, Mass.

[22] Filed: Sept. 7, 1971

[21] Appl. No.: 178,398

[52] U.S. Cl. ............................. 424/352, 260/648 F
[51] Int. Cl. ........................................... A61k 27/00
[58] Field of Search ................. 260/648 F; 424/352

[56] References Cited
OTHER PUBLICATIONS
Larsen, Fluorine Chemistry Review, Vol 3, 1969, pages 1, 34 and 35.

*Primary Examiner*—Jerome D. Goldberg
*Attorney, Agent, or Firm*—Armand McMillan; C. E. Parker

[57] ABSTRACT

Certain trifluoromethylcyclobutanes are disclosed which possess utility as inhalation anesthetics. They are: 1-chloro-2-trifluoromethyl-2,3,3-trifluorocyclobutane, 1-bromo-2-trifluoromethyl-2,3,3-trifluorocyclobutane, 1-methyl-2-trifluoromethyl-2,3,3-trifluorocyclobutane and 1,2,3,-3-tetrafluoro-2-trifluoromethylcyclobutane.

5 Claims, No Drawings

ANESTHETIC TRIFLUOROMETHYLCYCLOBUTANES

THE PRIOR ART

In the continuing search for safe, effective inhalation anesthetics that began with the introduction of chloroform in the middle of the last century, surprisingly few compounds have qualified for that drastic yet delicate role. This penury derives in part from the unpredictable chemical and physiological properties and behavior of plausible compounds such as for instance the lower halogenated alkanes, as well as from the lack of understanding of the mode of action of anesthetics in general. While some superficial parameters have been evolved to gauge a few of the necessary properties of a good inhalation anesthetic; e.g., a certain oil-water distribution coefficient and the negative influence of fluorine as opposed to that of chlorine, the discovery of a useful anesthetic agent remains beyond the scope of the routine expertise of both the chemist and the physiologist. Thus it is, for instance, that while cyclopropane is recognized as an effective if inflammable anesthetic, one of its higher water-insoluble homologs, cyclopentane, has no medical use. As to cyclobutanes, a recent review of the state of the art [Larsen, E. R., Fluorine Chemistry Reviews, Vol. 3, pages 1 and 34 (1969)] is no more enlightening in its report that of three closely related fluorocyclobutanes, one is said to possess anesthetic properties (1,2-dihydrohexafluoro-) while the others are toxic (1,2-dichlorohexafluoro-) and inactive (octafluoro-) respectively.

SUMMARY OF THE INVENTION

It has now been discovered that certain trifluoromethylcyclobutanes possess inhalation anesthetic properties and do not cause convulsions and death when administered in concentrations within the useful range. The compounds found to possess this utility are: 1-chloro-2-trifluoromethyl-2,3,3-trifluorocyclobutane, 1-bromo-2-trifluoromethyl-2,3,3-trifluorocyclobutane, 1-methyl-2-trifluoromethyl-2,3,3-trifluorocyclobutane and 1,2,3,3-tetrafluoro-2-trifluoromethylcyclobutane.

DETAILED DESCRIPTION

The compounds of this invention can be prepared by cyclizing appropriately selected ethylenic compounds in an autoclave according to the method of Coffman, et al., [J. Am. Chem. Soc. 71, 490 (1949)]. The ethylenic compounds are typically charged into the autoclave and heated at a suitable temperature; e.g., at about 200°C, for a period of, for example, about 7 hours at autogenous pressure. When the reaction is complete, the autoclave is cooled and gaseous substances are evacuated through a cold trap. The liquid content is then removed and subjected to a preliminary distillation followed by final purification by means of preparatory scale vapor phase chromatography or by other suitable techniques. Compounds of sufficiently high purity for anesthetic use are obtained in this manner.

The ethylenic compounds employed in synthesizing the anesthetic products of this invention are listed in the Table 1 along with some of the physical properties of the products. The cyclic structure as well as the Table 1

Synthesis and Physical Properties of Anesthetic Compounds

| Ex. | 2-Trifluoromethyl-cyclobutane | Reactants | Density ($d_4^t$) | Boiling Point |
|---|---|---|---|---|
| I | 1-chloro-2,3,3-trifluoro- | $F_3C.CF{=}CF_2$ + vinyl chloride | $1.525^{21}$ | 88°C |
| II | 1-bromo-2,3,3-trifluoro- | $F_3C.CF{=}CF_2$ + vinyl bromide | (a) $1.790^{22}$ (b) $1.802^{21}$ | 103°C 106.5°C |
| III | 1-methyl-2,3,3-trifluoro- | $F_3C.CF{=}CF_2$ + propylene | $1.319^{24}$ | 80°C |
| IV | 1,2,3,3-tetrafluoro- | $F_3C.CF{=}CF_2$ + vinyl fluoride | $1.505^{21}$ | 68°C | number and type of ring substituents were confirmed by analysis of the NMR spectra.

The anesthetic compounds shown in Table 1 are clear liquids at room temperature. They can be stored in containers of the type commonly used for conventional anesthetics of comparable boiling point; e.g., halothane, and they can be administered by means of apparatus or machines designed to vaporize liquid anesthetics and mix them with air, oxygen or other gaseous combinations in amounts capable of supporting respiration. It is further contemplated that the compounds herein disclosed may be used in admixture with pharmaceutically acceptable diluents and stabilizers such as thymol, or in combination with one or more of the known inhalation anesthetics; e.g., nitrous oxide, ether, halothane, chloroform, methoxyfluorane and the like.

Anesthetic Properties

The physiological effects of the compounds of this invention were demonstrated upon mice, using a standard test for evaluation of inhalation anesthetics similar to that described by Robbins [Pharmacology and Experimental Therapeutics 86, 197 (1946)]. In this test, mice were exposed to the compounds for a period of 10 minutes in a rotating drum. Observations were then made of the pinch reflex, the corneal reflex and the return of the righting reflex. At least four graded doses were employed to determine the minimum concentration required to anesthetize 50 percent of the mice used ($AC_{50}$) and the minimum concentration required to kill 50 percent of the mice ($LC_{50}$). The anesthetic index (AI) was then calculated from these minimum concentrations. The data obtained with the compounds of Examples I to IV are presented in Table 2.

Table 2

Anesthetic Data

| Ex. | 2-Trifluoromethyl-cyclobutane | $AC_{50}$ | $LC_{50}$ | AI |
|---|---|---|---|---|
| | | (% volume) | | |
| I | 1-chloro-2,3,3-trifluoro- | <0.75% | 3.0% | 4+ |
| II | 1-bromo-2,3,3-trifluoro- | <0.5% | >1.5% | 3+ |
| | | <0.5% | >1% | 2+ |
| III | 1-methyl-2,3,3-trifluoro- | 1.5% | 5–7% | 3+ |
| IV | 1,2,3,3-tetrafluoro- | <4% | >5% | 1+ |

*Where two percentages are given, the actual vapor concentration lies between the two values.

The results shown in Table 2 demonstrate that the compounds listed are potent anesthetics with differing margins of safety. Each one of said compounds has proved capable of inducing a state of anesthesia in air-breathing animals, from which the animals recovered provided that the lethal concentrations of anesthetic vapors ($LC_{50}$) were not reached.

What we claim is:

1. The process of inducing anesthesia in a mammal which comprises administering by inhalation to said mammal an effective quantity to induce anesthesia of a cyclobutane selected from the group consisting of the 1-chloro-2-trifluoromethyl-2,3,3-trifluorocyclobutane, 1-bromo-2-trifluoromethyl-2,3,3-trifluorocyclobutane, 1-methyl-2-trifluoromethyl-2,3,3-trifluorocyclobutane and 1,2,3,3-tetrafluoro-2-trifluoromethylcyclobutane.

2. The process of claim 1 wherein the cyclobutane administered is 1-chloro-2-trifluoromethyl-2,3,3-trifluorocyclobutane.

3. The process of claim 1 wherein the cyclobutane administered is 1-bromo-2-trifluoromethyl-2,3,3-trifluorocyclobutane.

4. The process of claim 1 wherein the cyclobutane administered is 1-methyl-2-trifluoromethyl-2,3,3-trifluorocyclobutane.

5. The process of claim 1 wherein the cyclobutane administered is 1,2,3,3-tetrafluoro-2-trifluoromethylcyclobutane.

* * * * *

UNITED STATES PATENT OFFICE
CERTIFICATE OF CORRECTION

Patent No. 3,852,474  Dated December 3, 1974

Inventor(s) Charles W. Simons et al.

It is certified that error appears in the above-identified patent and that said Letters Patent are hereby corrected as shown below:

In Item [75] insert -- Gerald J. O'Neill, Arlington, Mass. --.

Signed and sealed this 13th day of May 1975.

(SEAL)
Attest:

RUTH C. MASON
Attesting Officer

C. MARSHALL DANN
Commissioner of Patents
and Trademarks